United States Patent
Wu et al.

(10) Patent No.: US 11,157,705 B2
(45) Date of Patent: Oct. 26, 2021

(54) SEMANTIC PARSING USING ENCODED STRUCTURED REPRESENTATION

(71) Applicant: International Business Machines Corporation, Armonk, NY (US)

(72) Inventors: Lingfei Wu, Elmsford, NY (US); Wei Zhang, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 148 days.

(21) Appl. No.: 16/518,120

(22) Filed: Jul. 22, 2019

(65) Prior Publication Data

US 2021/0026922 A1  Jan. 28, 2021

(51) Int. Cl.
*G06F 40/30* (2020.01)
*G06F 40/211* (2020.01)

(52) U.S. Cl.
CPC ............ *G06F 40/30* (2020.01); *G06F 40/211* (2020.01)

(58) Field of Classification Search
CPC ................................ G06F 40/30; G06F 40/211
See application file for complete search history.

(56) References Cited

U.S. PATENT DOCUMENTS

| | | | |
|---|---|---|---|
| 9,846,692 B2 | 12/2017 | Starostin et al. | |
| 9,858,263 B2 | 1/2018 | Xiao et al. | |
| 10,133,728 B2 | 11/2018 | Poon et al. | |
| 10,176,802 B1* | 1/2019 | Ladhak | G10L 15/16 |
| 2011/0270604 A1* | 11/2011 | Qi | G06F 16/3344 704/9 |
| 2018/0349767 A1 | 12/2018 | Xiao et al. | |
| 2020/0027446 A1* | 1/2020 | Ture | G06F 17/15 |
| 2020/0410337 A1* | 12/2020 | Huang | G06N 3/04 |

OTHER PUBLICATIONS

Li Dong and Mirella Lapata, "Language to Logical Form with Neural Attention," arXiv:1601.01280v2 [cs.CL] Jun. 6, 2016, 11 pages.

Kun Xu1 , Lingfei Wu2, ZhiguoWang2, Mo Yu2, Liwei Chen3, Vadim Sheinin, "Exploiting Rich Syntactic Information for Semantic Parsing with Graph-to-Sequence Model," arXiv:1808.07624v1 [cs.CL] Aug. 23, 2018, 7 pages.

Alvarez-Meliz et al "Tree-structured decoding with doubly-recurrent neural networks," Published as a conference paper at ICLR, 2017, 17 pages.

Bahdanau et al "Neural machine translation by jointly learning to align and translate," arXiv preprint arXiv:1409.0473 (2014), 15 pages.

Bastings et al "Graph convolutional encoders for syntax-aware neural machine translation," arXiv preprint arXiv:1704.04675 (2017), 11 pages.

(Continued)

*Primary Examiner* — Kevin Ky (74) *Attorney, Agent, or Firm* — Patterson + Sheridan, LLP (57) ABSTRACT

Aspects described herein include a method of semantic parsing, and related system and computer program product. The method comprises receiving an input comprising a plurality of words, generating a structured representation of the plurality of words, encoding the structured representation into a latent embedding space, and decoding the encoded structured representation from the latent embedding space into a logical representation of the plurality of words.

20 Claims, 5 Drawing Sheets

(56) References Cited

OTHER PUBLICATIONS

Beck et al "Graph-tosequence learning using gated graph neural networks," arXiv preprint arXiv:1806.09835 (2018), 13 pages.
Bird et al "Natural language processing with Python: analyzing text with the natural language toolkit," O'Reilly Media, Inc. 2009, 439 pages.
Chen et al "Sequence-to-action: End-to-end semantic graph generation for semantic parsing," arXiv preprint arXiv:1809.00773 (2018), 12 pages.
Dong et al "Coarse-to-fine decoding for neural semantic parsing" arXiv preprint arXiv:1805.04793 (2018), 12 pages.
Glorot et al "Deep sparse rectifier neural networks," Proceedings of the fourteenth international conference on artificial intelligence and statistics, 2011, pp. 315-323.
Gu et al "Top-down Tree Structured Decoding with Syntactic Connections for Neural Machine Translation and Parsing," arXiv preprint arXiv:1809.01854 (2018), 13 pages.
Jia et al "Data recombination for neural semantic parsing," arXiv preprint arXiv:1606.03622 (2016), 11 pages.
Jie et al "Dependency-based hybrid trees for semantic parsing," arXiv preprint arXiv:1809.00107 (2018), 11 pages.
Kingma et al "Adam: A method for stochastic optimization," arXiv preprint arXiv:1412.6980 (2014), 15 pages.
Ling et al "Latent predictor networks for code generation," arXiv preprint arXiv:1603.06744 (2016), 11 pages.
Luong et al "Effective approaches to attention-based neural machine translation," arXiv preprint arXiv:1508.04025 (2015), 11 pages.
Manning et al "The Stanford CoreNLP natural language processing toolkit," Proceedings of 52nd annual meeting of the association for computational linguistics: system demonstrations, 2014, pp. 55-60.
Rabinovich et al "Abstract syntax networks for code generation and semantic parsing," arXiv preprint arXiv:1704.07535 (2017), 11 pages.
Reddy et al "Transforming dependency structures to logical forms for semantic parsing," Transactions of the Association for Computational Linguistics 4 (2016), pp. 127-140.
Song et al "A graph-to-sequence model for amr-to-text generation," arXiv preprint arXiv:1805.02473 (2018), 11 pages.
Xu et al "Graph2seq: Graph to sequence learning with attention-based neural networks," arXiv preprint arXiv:1804.00823 (2018), 18 pages.
Yin et al "A syntactic neural model for general-purpose code generation," arXiv preprint arXiv:1704.01696 (2017), 14 pages.
Yin et al "Structvae: Tree-structured latent variable models for semi-supervised semantic parsing," arXiv preprint arXiv:1806.07832 (2018), 15 pages.
Yu et al "SyntaxSQLNet: Syntax Tree Networks for Complex and Cross-DomainText-to-SQL Task," arXiv preprint arXiv:1810.05237 (2018), 11 pages.
Zhang et al "Graph convolution over pruned dependency trees improves relation extraction," arXiv preprint arXiv:1809.10185 (2018), 13 pages.

* cited by examiner

SEMANTIC PARSING USING ENCODED STRUCTURED REPRESENTATION

BACKGROUND

The present invention relates to semantic parsing, and more specifically, using an encoded structured representation of the text within semantic parsing.

Semantic parsing is the task of translating a natural language text into machine-interpretable representations of the meaning of the natural language text, like logical forms or executable queries. Semantic parsing plays an important role in question answering systems, deep learning systems, and so forth. In semantic parsing, the meaning of the natural language text may be represented as a structured object, such as a tree structure. However, many neural semantic parsers tend to consider only word sequence information, ignoring syntactic information that may be presented by the structured object.

SUMMARY

According to one embodiment of the present invention, a method of semantic parsing comprises receiving an input comprising a plurality of words, generating a structured representation of the plurality of words, encoding the structured representation into a latent embedding space, and decoding the encoded structured representation from the latent embedding space into a logical representation of the plurality of words.

According to another embodiment of the present invention, a system comprises one or more computer processors configured to perform an operation for semantic parsing. The operation comprises receiving an input comprising a plurality of words, generating a structured representation of the plurality of words, encoding the structured representation into a latent embedding space, and decoding the encoded structured representation from the latent embedding space into a logical representation of the plurality of words.

According to another embodiment of the present invention, a computer program product comprises a computer-readable storage medium having computer-readable program code embodied therewith. The computer-readable program code is executable by one or more computer processors to perform an operation for semantic parsing. The operation comprises receiving an input comprising a plurality of words, generating a structured representation of the plurality of words, encoding the structured representation into a latent embedding space, and decoding the encoded structured representation from the latent embedding space into a logical representation of the plurality of words.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments, and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

Embodiments discussed herein are generally directed to a graph neural network (GNN)-based neural semantic parser that considers syntactic information presented in the structured object of the meaning representation. The semantic parser may be implemented as a graph-to-tree (or "Graph2Tree") semantic parser. In some embodiments, the semantic parser comprises a graph encoder that learns from a syntactic graph constructed from a word sequence and a corresponding dependency parse tree, a constituency parse tree, or an abstract meaning representation. The semantic parser further comprises a tree decoder that captures the structure of the logic form from vector representations of the learned graph. Some embodiments also include an attention mechanism that learns soft alignments between the syntactic graph and the logic form. Beneficially, by using the syntactic information contained in the syntactic graph, the performance of the semantic parser is improved compared with existing approaches such as sequence-to-sequence ("Seq2Seq"), sequence-to-tree ("Seq2Tree"), and graph-to-sequence ("Graph2Seq") models.

Figure 1:
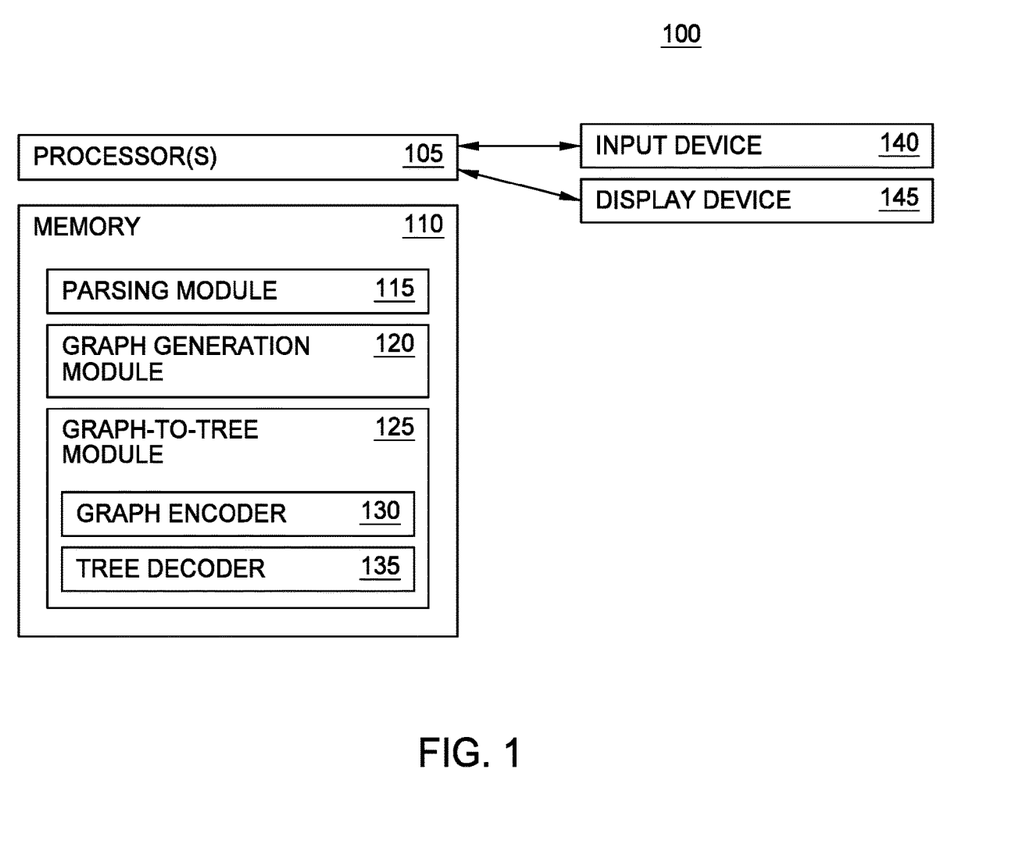
FIG. 1 is a block diagram illustrating an exemplary system capable of performing semantic parsing, according to one or more embodiments.

FIG. 1 is a block diagram illustrating an exemplary system 100 capable of performing semantic parsing, according to one or more embodiments. The system 100 comprises one or more processors 105 and a memory 110. The one or more processors 105 may be implemented in any suitable form, such as a general purpose microprocessor, a controller, an application-specific integrated circuit (ASIC), and so forth. The memory 110 may include a variety of computer-readable media selected for their size, relative performance, or other capabilities: volatile and/or non-volatile media, removable and/or non-removable media, etc. Further, the one or more processors 105 and/or the memory 110 may be included in a single computing device, or may be distributed among multiple communicatively-coupled computing devices.

The memory 110 may include one or more "modules" or "sub-modules" for performing various functions described herein. In one embodiment, each module or sub-module includes program code that is executable by the one or more processors 105. However, other embodiments may have functionality that is partially or fully implemented in hardware (i.e., circuitry) or firmware of the system 100. As shown, the system 100 comprises a parsing module 115, a graph generation module 120, and a graph-to-tree module 125, although other combinations of the described functionality are also contemplated.

The parsing module 115 receives natural language text and generates a structural (hierarchical) representation of the natural language text. In some embodiments, the parsing module 115 generates one of a dependency parse tree, a constituency parse tree, and an abstract meaning representation (AMR) from the natural language text. The parsing module 115 may comprise additional functionality, such as processing the natural language text to generate tokens from the sequence of characters, checking the natural language text for correct syntax, and so forth.

The graph generation module 120 receives the structural representation from the parsing module 115, and constructs (or otherwise generates) a syntactic graph from the structural representation. The syntactic graph may be represented in the form G=(V,E), where V represents a set of vertices and E represents a set of ordered pairs of vertices. The set of vertices V may correspond to the set of words included in the natural language text, and in some cases may also correspond to punctuation, stems and affixes, etc. The set of ordered pairs of vertices E may reflect the head-dependent and grammatical relationships between the elements included in the set of vertices V. In other embodiments, the graph generation module 120 constructs an AMR graph (e.g., a semantic graph to represent the structural representation).

The graph-to-tree module 125 comprises a graph encoder 130 that encodes the syntactic graph into a vector representation. In some embodiments, the graph encoder 130 is an inductive node embedding algorithm. The inductive node embedding algorithm may generate bi-directional node embeddings (that is, forward and backward embeddings). Each node embedding learns its vector representation by aggregating information from a node local neighborhood, e.g., within K hops within the graph.

The graph-to-tree module 125 further comprises a tree decoder 135 that learns to generate a logical form conditioned on the graph-level vector representation provided by the graph encoder. In some embodiments, the tree decoder 135 defines a plurality of tokens, such as a "nonterminal" ⟨n⟩ token to start decoding a subtree and a special token ⟨/s⟩ that indicates the end of a sequence. In some embodiments, the tree decoder 135 uses long short-term memory (LSTM) units to decode the logic form of a subtree until the special token ⟨/s⟩ is encountered. The tree decoder 135 may generate portions of the logic forms by conditioning on the corresponding nonterminal node's hidden representation. To fully utilize the information stored in each nonterminal node, the tree decoder 135 may use a parent-feeding scheme to provide additional input of nonterminal node embedding to augment with the inputs and fed into the LSTM units. In some embodiments, the tree decoder 135 uses one or more attention mechanisms to incorporate hidden vectors of the inputs within the decoding process. Although the discussion of the tree decoder 135 focuses on an implementation having LSTM units, other implementations may use other decoders for structured outputs, such as a modular decoder.

The system 100 further comprises an input device 140 that is communicatively coupled with the one or more processors 105. In some embodiments, the natural language text for semantic parsing is provided via the input device 140. The input device 140 may be implemented in any suitable form, such as a keyboard or touchscreen that receives the natural language text from user input, an external computing device that is coupled with the one or more processors 105 via one or more networks, and so forth. Thus, in some embodiments, the input device 140 may be integrated with the one or more processors 105 and the memory 110. In other embodiments, the input device 140 may be external to the one or more processors 105 and/or the memory 110. In cases that the input device 140 is implemented using an external computing device, the input device 140 may store the natural language text, may perform speech recognition processing from a microphone or audio file, and so forth.

The system 100 further comprises a display device 145 that displays a visual interface to a user. The display device 145 may be implemented with any suitable display technology: light emitting diode (LED), organic LED (OLED), cathode ray tube (CRT), liquid crystal display (LCD), plasma, electroluminescence (EL), and so forth. In some embodiments, the display device 145 is integrated with the one or more processors 105 and the memory 110 (e.g., a display of a laptop computer, a tablet, a smartphone). In other embodiments, the display device 145 is external to the one or more processors 105 and the memory 110, such as an external monitor that is integrated with, or external to, the input device 140.

In some embodiments, the display device 145 displays the input provided via the input device (e.g., natural language text comprising a plurality of words) and the logical representation of the plurality of words (e.g., determined using the graph-to-tree module 125). A user may provide feedback about the accuracy of the logical representation via the input device 140. In some embodiments, the feedback provided by the user adjusts the construction of the syntactic graph, as some iterations of graph construction may perform better or worse than others.

Figure 2:
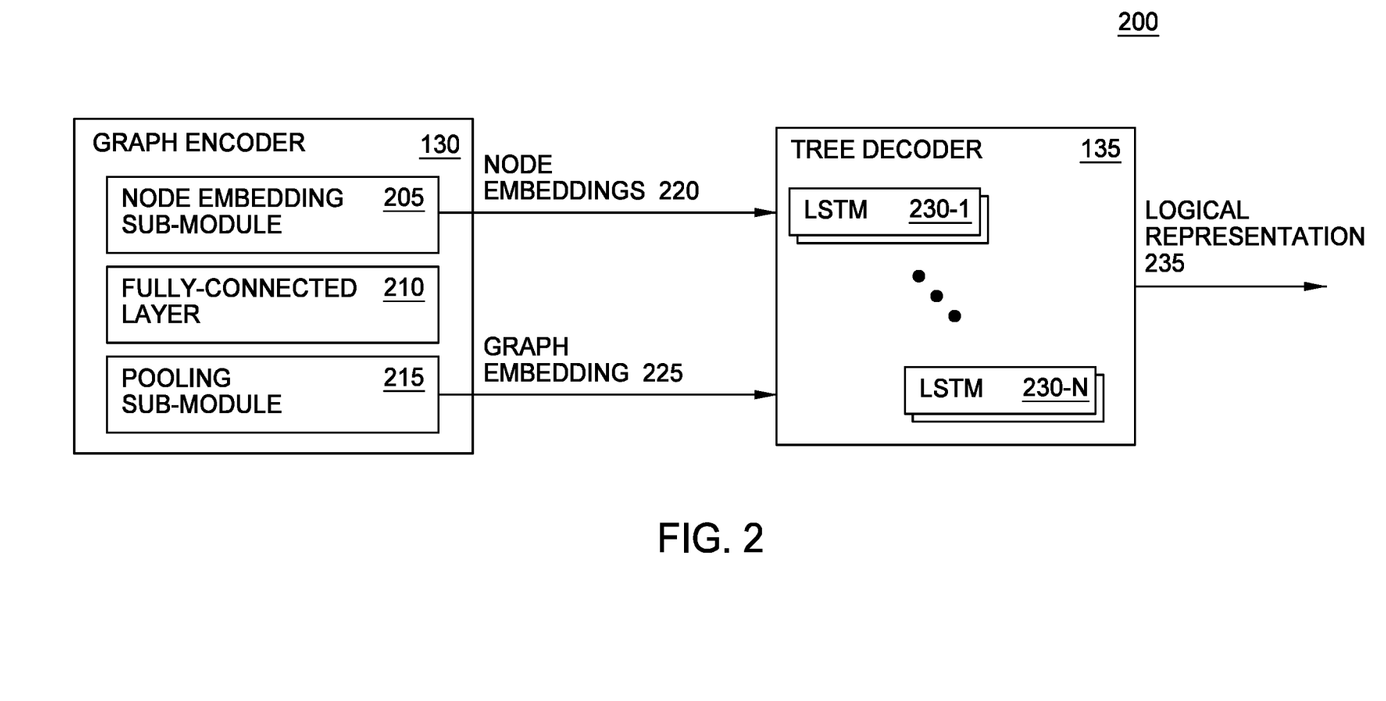
FIG. 2 is a block diagram illustrating an exemplary graph encoder and tree decoder, according to one or more embodiments.

FIG. 2 is a block diagram 200 illustrating an exemplary graph encoder 130 and tree decoder 135, according to one or more embodiments. The features illustrated in FIG. 2 may be used in conjunction with other embodiments.

The graph encoder 130 comprises a node embedding sub-module 205 that determines node embeddings 220. In some embodiments, the node embedding sub-module 205 implements a bi-directional embedding model, such that the node embeddings 220 comprise forward and backward embeddings. In some embodiments, the node embedding sub-module 205 receives a graph G=(V,E), and generates a feature vector $a_v$ for all nodes from v's text attribute using, e.g., LSTM units. In another embodiment, the text attribute of the node v is transformed to the feature vector $a_v$ by looking up an embedding matrix $W^k$. The feature vectors $a_v$ may be used as an initial iteration of the node embeddings 220, which may be represented as: $h_{v\vdash}^0 = a_v$, $h_{v\dashv}^0 = a_v$, $\forall v \in V$.

The node embedding sub-module 205 may categorize the neighbors of the node v into forward neighbors $N_\vdash(v)$ and backward neighbors $N_\dashv(v)$, according to the edge direction. Stated another way, $N_\vdash(v)$ returns the nodes that the node v directs to, and $N_\dashv(v)$ returns the nodes that direct to the node v.

The node embedding sub-module 205 may aggregate the forward representations of the forward neighbors $N_\vdash(v)$ into a single vector: $h_{N_\vdash(v)}^k = M_\vdash^k(\{h_{v\vdash}^{k-1}, \forall v \in N_\vdash(v)\})$, where $k \in \{1, \ldots, K\}$ represents an iteration index and $M_\vdash^k$ represents a forward aggregator function. The node embedding sub-module 205 may concatenate the current forward representation of $v(h_{v\vdash}^{k-1})$ with the neighborhood vector $h_{N_\vdash(v)}^k$, which may be represented as CONCAT($h_{v\vdash}^{k-1}, h_{N_\vdash(v)}^k$). The node embedding sub-module 205 feeds the concatenated vector CONCAT($h_{v\vdash}^{k-1}, h_{N_\vdash(v)}^k$) into a fully-connected layer 210 of the graph encoder 130 with a non-linear activation function σ, which may be represented as: $h_{v\vdash}^k = \sigma(W^k \cdot \text{CONCAT}(h_{v\vdash}^{k-1}, h_{N_\vdash(v)}^k))$. This updates the forward representation of the node v to be used in the next iteration ($h_{v\vdash}^k$).

The node embedding sub-module 205 may update a backward representation of the node v according to: $h_{N_\vdash(v)}^k = M_\dashv^k(\{h_{v\dashv}^{k-1}, \forall v \in N_\dashv(v)\})$, where $M_\dashv^k$ represents a backward aggregator function, and concatenate the current backward representation of $v(h_{v\dashv}^{k-1})$ with the neighborhood vector $h_{N_\vdash(v)}^k$, which may be represented as CONCAT($h_{v\dashv}^{k-1}, h_{N_\dashv(v)}^k$). The node embedding sub-module 205 feeds the concatenated vector CONCAT($h_{v\dashv}^{k-1}, h_{N_\dashv(v)}^k$) into the fully-connected layer 210 with the non-linear activation function σ, which may be represented as: $h_{v\dashv}^k = \sigma(W^k \cdot \text{CONCAT}(h_{v\dashv}^{k-1}, h_{N_\dashv(v)}^k))$. This updates the forward representation of the node v to be used in the next iteration ($h_{v\dashv}^k$).

After the forward representation and the backward representation of the node v are calculated K times, the concatenation of the final forward representation and the backward representation may used as a final bi-directional representation of the node v: $z_v = \text{CONCAT}(h_{v\vdash}^K, h_{v\dashv}^K)$, $\forall v \in V$. Because the neighbor information from different hops of the graph may influence the node embedding differently, a distinct aggregator may be determined at each iteration.

The graph encoder 130 further comprises a pooling sub-module 215 that performs an aggregation function of the node embeddings 220 to generate the graph embedding 225. Each node neighbor's vector has been fed through the fully-connected layer 210, and the pooling sub-module 215 applies an element-wise max-pooling operation is applied:

AGGREGATE$_k^\vdash$ = max($\{\sigma(W_{pool} h_{v\vdash}^k + b), v \in N_\vdash(v)\}$), AGGREGATE$_k^\dashv$ = max($\{\sigma(W_{pool} h_{v\dashv}^k + b), v \in N_\dashv(v)\}$), where max denotes the element-wise max operator. By applying max-pooling, the graph encoder 130 can capture different information across the neighborhood set. In other embodiments, the pooling sub-module 215 may be replaced by other aggregation functions, such as an attention-based aggregation function.

The tree decoder 135 receives the node embeddings 220 and the graph embedding 225. A logical representation 235 of the plurality of words of the natural language text is output by the tree decoder 135.

The tree decoder 135 comprises a plurality of LSTM units 230-1, 230-2, ..., 230-N. In some embodiments, the plurality of LSTM units 230-1, 230-2, ..., 230-N are arranged in a plurality of stages, such that a first portion of the plurality of LSTM units 230-1, 230-2, ..., 230-N perform decoding in a first stage, and a second portion of the plurality of LSTM units 230-1, 230-2, ..., 230-N perform decoding in a second stage downstream of the first stage.

In some embodiments, the first portion of the plurality of LSTM units 230-1, 230-2, ..., 230-N decode the logic form of the graph embedding 225, stopping the decoding upon encountering the special token ⟨/s⟩ indicating the end of a sequence. In some embodiments, the first portion of the plurality of LSTM units 230-1, 230-2, ..., 230-N generates part of the logical form by conditioning on the hidden representation of the corresponding nonterminal node. To fully utilize the information of the nonterminal node, a parent-feeding scheme may provide additional inputs of the nonterminal node embedding to augment with the inputs and fed into the second portion of the plurality of LSTM units 230-1, 230-2, ..., 230-N.

Figure 3:
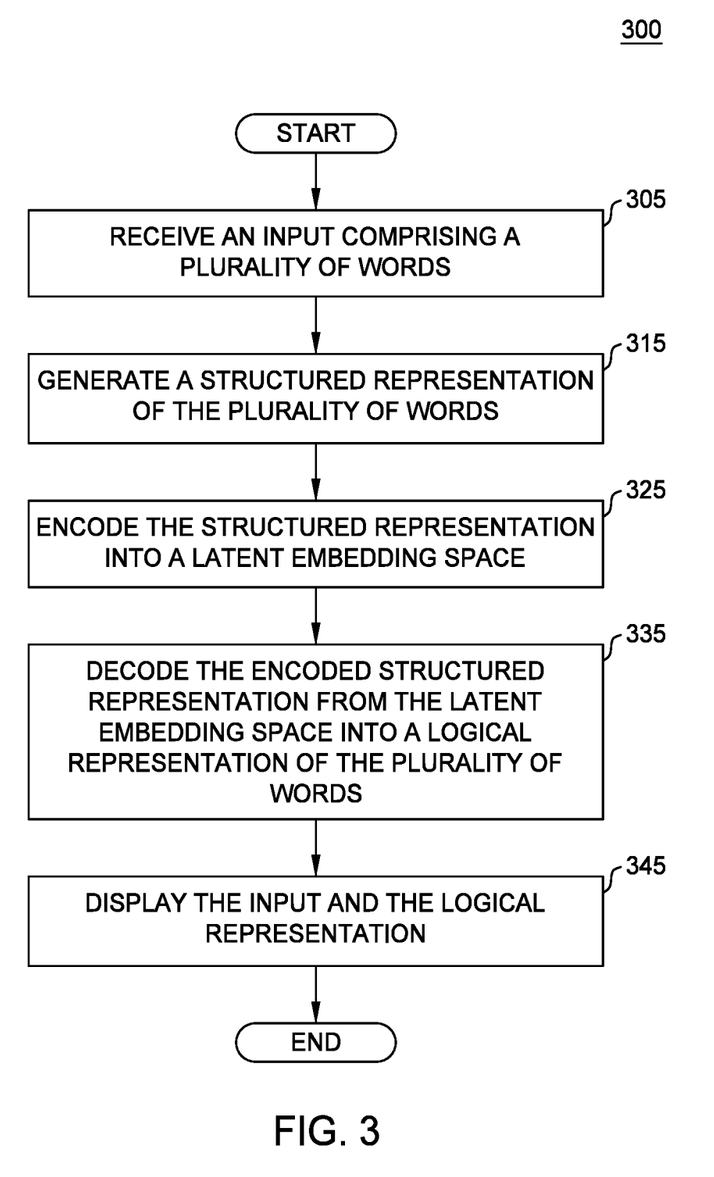
FIG. 3 is an exemplary method of performing semantic parsing, according to one or more embodiments.

FIG. 3 is an exemplary method 300 of performing semantic parsing, according to one or more embodiments. The method 300 may be performed in conjunction with other embodiments, e.g., using the system 100 of FIG. 1.

The method 300 begins at block 305, where the system receives an input comprising a plurality of words. At block 315, the system generates a structured representation of the plurality of words. In some embodiments, the structured representation is one of a dependency parse tree, a constituency parse tree, and an abstract meaning representation.

At block 325, the system encodes the structured representation into a latent embedding space. In some embodiments, encoding the structured representation comprises encoding a syntactic graph into a vector representation comprising bi-directional node embeddings.

At block 335, the system decodes the encoded structural representation from the latent embedding space into a logical representation of the plurality of words. In some embodiments, decoding the encoded structural representation is performed using a plurality of LSTM units. At block 345, the system displays the input and the logical representation. In some embodiments, a user input may provide feedback about the accuracy of the logical representation. The method 300 ends following completion of block 345.

Figure 4:
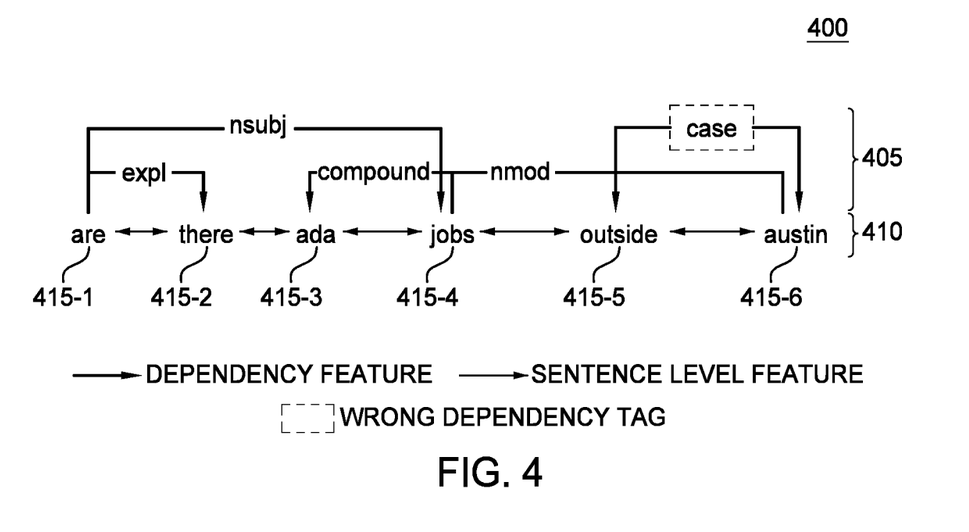
FIG. 4 is a diagram illustrating dependencies included in an exemplary graph, according to one or more embodiments.

FIG. 4 is a diagram 400 illustrating dependencies included in an exemplary graph, according to one or more embodiments. More specifically, the diagram 400 illustrates a dependency parse tree that is referenced to a word sequence. The features illustrated in FIG. 4 may be used in conjunction with other embodiments.

In the diagram 400, a word sequence 410 provides a respective node 415-1, ..., 415-6 for each word of the input text ("are there ada jobs outside austin"). The node 415-1 is connected with the node 415-2, the node 415-2 is connected with the node 415-3, and so forth.

Dependencies 405 are illustrated that indicate grammatical relationships between two words of the word sequence 410. The dependencies 405 include an expletive (expl) dependency relating the nodes 415-1, 415-2 ("are", "there"), a nominal subject (nsubj) dependency relating the nodes 415-1, 415-4 ("are", "jobs"), a nominal modifier (nmod) dependency relating the nodes 415-4, 415-6 ("jobs", "austin"), a compound dependency relating the nodes 415-4, 415-3 ("jobs", "ada"), and a case marking (case) dependency relating the nodes 415-6, 415-5 ("austin", "outside"). Each of the dependencies 405 may have their label converted into a respective node that is included in a syntactic graph with the nodes 415-1, . . . , 415-6.

Figure 5:
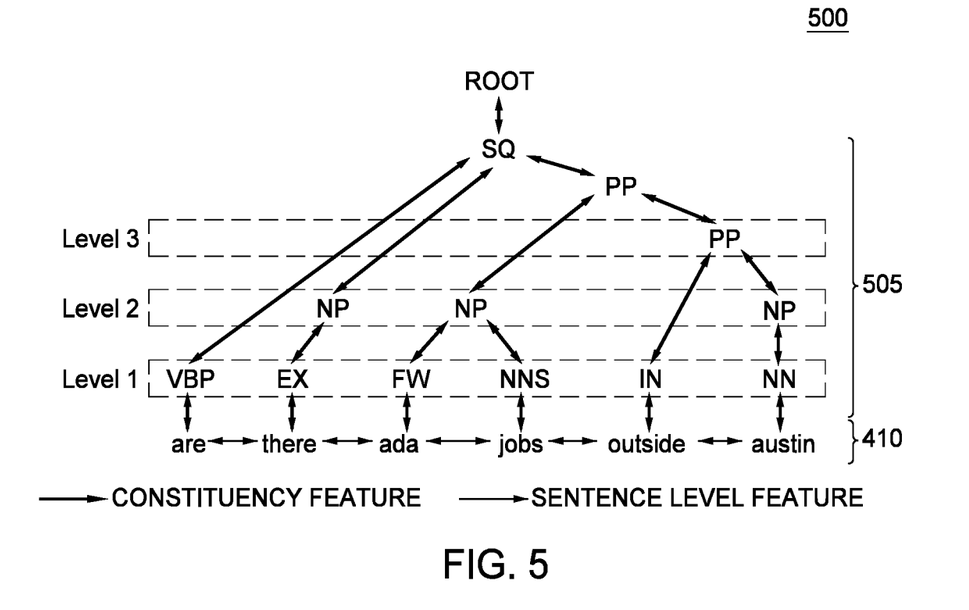
FIG. 5 is a diagram illustrating constituencies included in an exemplary graph, according to one or more embodiments.

FIG. 5 is a diagram 500 illustrating constituencies included in an exemplary graph, according to one or more embodiments. More specifically, the diagram 500 illustrates a constituency tree that is referenced to the word sequence 410. The features illustrated in FIG. 5 may be used in conjunction with other embodiments.

In the diagram 500, constituencies 505 are illustrated that indicate phrase structure information that is included in the word sequence 410. Within a first level (Level 1), "are" is represented as VBP (a non-3rd person singular present verb), "there" is represented as EX (an existential "there"), "ada" is represented as FW (a foreign word), "jobs" is represented as NNS (a plural noun), "outside" is represented as IN (a preposition), and "austin" is represented as NN (a noun).

Within a second level (Level 2), EX is linked to a first noun phrase (NP), FW and NNS are linked to a second NP, and NN is linked to a third NP. Within a third level (Level 3), IN and the third NP are linked to a first prepositional phrase (PP). Within a fourth level, the second NP and the first PP are linked to a second PP. Within a fifth level, VBP, the first NP, and the second PP are linked to a question (SQ). SQ is then linked to a root level (ROOT).

Figure 6:
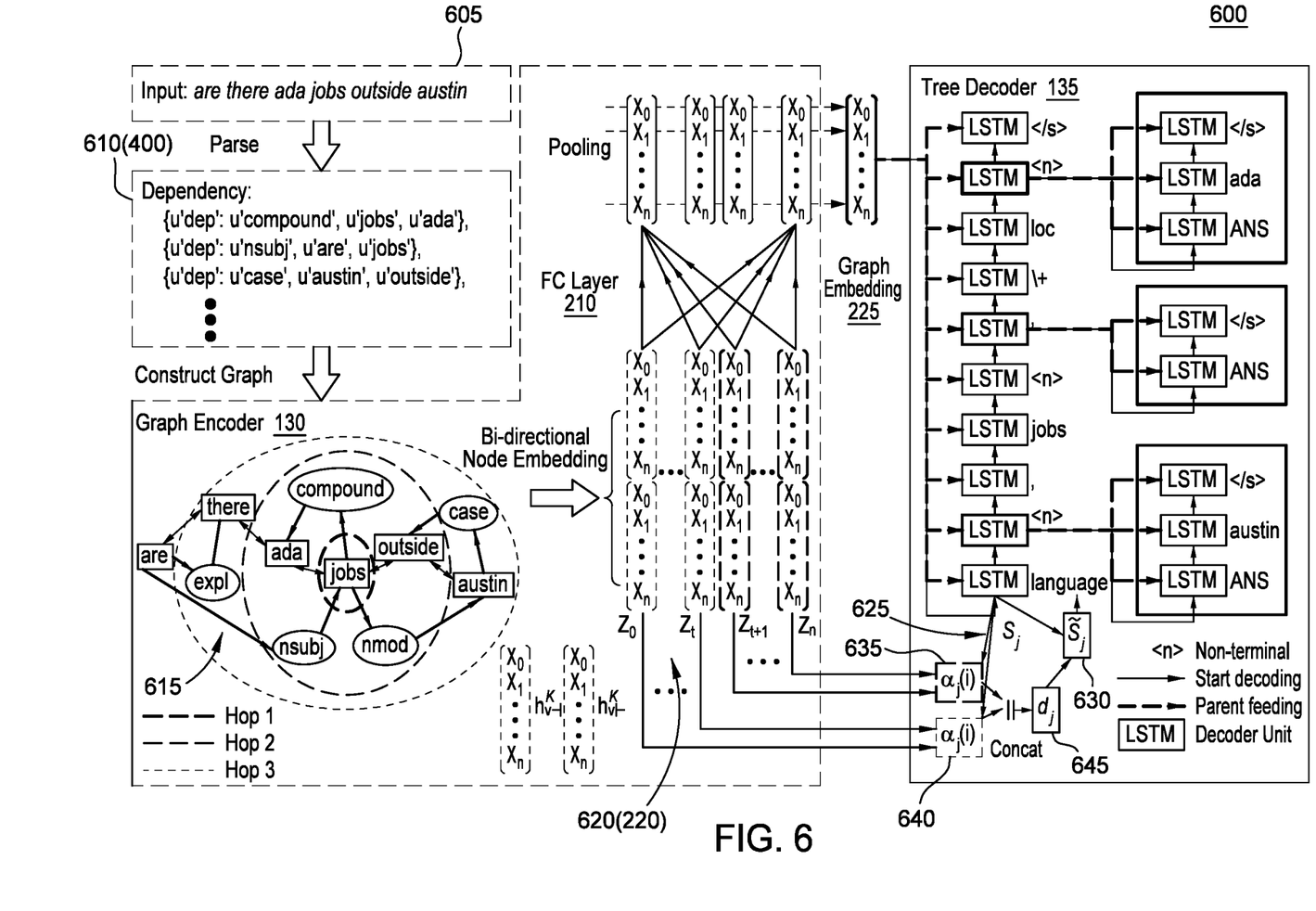
FIG. 6 is a block diagram illustrating exemplary operation of the graph encoder and tree decoder, according to one or more embodiments.

FIG. 6 is a block diagram 600 illustrating exemplary operation of the graph encoder 130 and tree decoder 135, according to one or more embodiments. The features illustrated in FIG. 6 may be used in conjunction with other embodiments, e.g., performed using the system 100 of FIG. 1.

The system receives an input 605 comprising a plurality of words ("are there ada jobs outside austin"). The system parses the input 605 and determines dependencies 610 between words. The system constructs a graph 615 from the dependencies 610. As shown, the graph 615 includes nodes for each of the words and each of the dependencies, which are arranged in different hops.

The system generates bi-directional node embeddings 620 (one example of the node embeddings 220) from the graph 615. As shown, the bi-directional node embeddings 620 comprise, for each node, a concatenation of the forward representation and the backward representation of the node. The bi-directional node embeddings 620 are fed through the fully-connected (FC) layer 210 of the graph neural network, and the element-wise max-pooling operation is performed on the bi-directional node embeddings 620 to generate the graph embedding 225.

The tree decoder 135 receives the graph embedding 225. The tree decoder 135 uses LSTM units to decode the logic form at depth 1 of the subtree that corresponds to parts of logic form t until the special token ⟨/s⟩ is encountered. The tree decoder 135 further generates the parts of the logic forms by conditioning on the hidden representation of the corresponding nonterminal node. To fully utilize the information of the nonterminal node, a parent-feeding scheme is employed to provide additional input of nonterminal node embedding to augment with the inputs and fed into LSTM.

In some embodiments, the tree decoder 135 includes an attention mechanism to determine alignments between the graph 615 and the logical representation generated by the tree decoder 135. The attention mechanism may incorporate the hidden vectors of the inputs in the decoding performed by the tree decoder 135. In some embodiments, the tree decoder 135 determines a context vector 625 (represented as $s_j$) that depends on a set of node representations $(h_1, \ldots, h_V)$ to which the graph encoder 130 maps the input graph 615.

In some embodiments, the tree decoder 135 computes separate attention mechanisms over the node representations corresponding to the original word tokens and the parsing tree nodes to compute a final context vector 630 (represented as a hidden state $\tilde{s}_j$) for decoding tree-structured outputs. The hidden state $\tilde{s}_j=(s_j+d_j)$, where $d_j=(\Sigma\alpha_i s_i + \Sigma\alpha_j s_j)$. The model may be jointly trained to maximize the conditional log-probability of the correct description given a syntactic graph G.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method of semantic parsing, the method comprising:
    receiving an input comprising a plurality of words;
    generating a structured representation of the plurality of words, wherein generating the structured representation comprises generating a graph including semantic information and syntactic information of the plurality of words;
    encoding the structured representation into a latent embedding space, wherein encoding the structured representation comprises:
        generating bi-directional node embeddings for each node of a plurality of nodes of the graph; and
        generating a graph embedding from the bi-directional node embeddings; and
    decoding the encoded structured representation from the latent embedding space into a logical representation of the plurality of words.

2. The method of claim 1, wherein generating the graph comprises:
    determining a word sequence of the plurality of words; and
    determining at least one of a dependency parse tree, constituency parse tree, and an abstract meaning representation graph that is referenced to the word sequence.

3. The method of claim 1, wherein generating the graph embedding comprises one of:
    performing a max-pooling operation on the node embeddings; and
    performing an attention-based aggregation on the node embeddings.

4. The method of claim 1, wherein decoding the encoded structured representation comprises:
    determining, using an attention mechanism, alignments between the graph and the logical representation.

5. The method of claim 1, further comprising:
    displaying the input and the logical representation.

6. The method of claim 1, wherein generating the bi-directional node embeddings comprises:
    for each node of the plurality of nodes, categorizing each neighboring node of the node, as one of a forward neighbor and a backward neighbor;
    aggregating, over a plurality of iterations, the forward neighbors corresponding to the plurality of nodes into a first vector; and
    aggregating, over the plurality of iterations, the backward neighbors corresponding to the plurality of nodes into a second vector.

7. The method of claim 6, wherein generating the bi-directional node embeddings further comprises:
for each iteration of the plurality of iterations:
concatenating a current forward representation of the node with a first neighborhood vector to provide a first concatenated vector; and
concatenating a current backward representation of the node with a second neighborhood vector to provide a second concatenated vector.

8. The method of claim 7, wherein generating the bi-directional node embeddings further comprises:
updating the current forward representation of the node by feeding the first concatenated vector into a fully connected layer having a non-linear activation function; and
updating the current backward representation of the node by feeding the second concatenated vector into the fully connected layer.

9. The method of claim 8,
wherein updating the current forward representation of the node and updating the current forward representation of the node occur at each iteration of the plurality of iterations prior to a final iteration, and
wherein generating the bi-directional node embeddings further comprises:
at the final iteration, concatenating a final forward representation of the node with a final backward representation of the node.

10. The method of claim 6,
wherein, for each iteration of the plurality of iterations, a distinct aggregator is used when aggregating the forward neighbors and when aggregating the backward neighbors.

11. The method of claim 1, wherein generating the graph embedding comprises:
aggregating the bi-directional node embeddings using one of: an element-wise max-pooling operation, or an attention-based aggregation function.

12. A system comprising:
one or more computer processors configured to perform an operation for semantic parsing, the operation comprising:
receiving an input comprising a plurality of words;
generating a structured representation of the plurality of words, wherein generating the structured representation comprises generating a graph including semantic information and syntactic information of the plurality of words;
encoding the structured representation into a latent embedding space, wherein encoding the structured representation comprises:
generating bi-directional node embeddings for each node of a plurality of nodes of the graph; and
generating a graph embedding from the bi-directional node embeddings; and
decoding the encoded structured representation from the latent embedding space into a logical representation of the plurality of words.

13. The system of claim 12, wherein generating the graph comprises:
determining a word sequence of the plurality of words; and
determining at least one of a dependency parse tree, constituency parse tree, and an abstract meaning representation graph that is referenced to the word sequence.

14. The system of claim 12, wherein generating the graph embedding comprises one of:
performing a max-pooling operation on the node embeddings; and
performing an attention-based aggregation on the node embeddings.

15. The system of claim 12, wherein decoding the encoded structured representation comprises:
determining, using an attention mechanism, alignments between the graph and the logical representation.

16. The system of claim 12, further comprising:
displaying the input and the logical representation.

17. A computer program product comprising:
a computer-readable storage medium having computer-readable program code embodied therewith, the computer-readable program code executable by one or more computer processors to perform an operation for semantic parsing, the operation comprising:
receiving an input comprising a plurality of words;
generating a structured representation of the plurality of words, wherein generating the structured representation comprises generating a graph including semantic information and syntactic information of the plurality of words;
encoding the structured representation into a latent embedding space, wherein encoding the structured representation comprises:
generating bi-directional node embeddings for each node of a plurality of nodes of the graph; and
generating a graph embedding from the bi-directional node embeddings; and
decoding the encoded structured representation from the latent embedding space into a logical representation of the plurality of words.

18. The computer program product of claim 17, wherein generating the graph comprises:
determining a word sequence of the plurality of words; and
determining at least one of a dependency parse tree, constituency parse tree, and an abstract meaning representation graph that is referenced to the word sequence.

19. The computer program product of claim 17, wherein generating the graph embedding comprises one of:
performing a max-pooling operation on the node embeddings; and
performing an attention-based aggregation on the node embeddings.

20. The computer program product of claim 17, wherein decoding the encoded structured representation comprises:
determining, using an attention mechanism, alignments between the graph and the logical representation.

* * * * *